(12) United States Patent
Hayabuchi et al.

(10) Patent No.: US 6,626,786 B2
(45) Date of Patent: Sep. 30, 2003

(54) SPEED SHIFT CONTROL APPARATUS OF AUTOMATIC TRANSMISSION

(75) Inventors: Masahiro Hayabuchi, Anjo (JP); Masaaki Nishida, Anjo (JP); Hiroshi Tsutsui, Anjo (JP); Kouichi Kojima, Anjo (JP); Yutaka Teraoka, Anjo (JP); Nobuhiro Iwai, Anjo (JP); Kiyoshi Akutsu, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/995,664

(22) Filed: Nov. 29, 2001

(65) Prior Publication Data
US 2002/0086761 A1 Jul. 4, 2002

(30) Foreign Application Priority Data
Dec. 28, 2000 (JP) ........................................ 2000-399862

(51) Int. Cl.[7] ............................................. F16H 61/00
(52) U.S. Cl. ........................................ 475/127; 477/144
(58) Field of Search ................................. 475/127, 128; 477/143, 144, 148, 149

(56) References Cited

U.S. PATENT DOCUMENTS

| | | | | |
|---|---|---|---|---|
| 4,742,732 A | * | 5/1988 | Hiramatsu | 477/119 |
| 4,989,477 A | * | 2/1991 | Hunter et al. | 477/148 |
| 5,014,573 A | * | 5/1991 | Hunter et al. | 477/61 |
| 5,038,636 A | * | 8/1991 | Vukovich et al. | 477/148 |
| 5,094,130 A | * | 3/1992 | Hirose et al. | 477/149 |
| 5,113,343 A | * | 5/1992 | Hunter et al. | 701/51 |
| 5,315,898 A | | 5/1994 | Koyama et al. | |
| 5,730,683 A | * | 3/1998 | Usuki et al. | 477/143 |
| 6,270,444 B1 | | 8/2001 | Tsutsui et al. | |

* cited by examiner

*Primary Examiner*—Ankur Parekh
(74) *Attorney, Agent, or Firm*—Oliff & Berridge, PLC

(57) ABSTRACT

At the time of the 6→3 speed shift, an automatic transmission achieves a 6→4→3 speed shift by controlling the servo pressures of four engageable elements. A control apparatus controls the servo pressure of one engageable element in accordance with the servo pressures of other engageable elements. The engagement and release timings are adjusted by determining and controlling the oil pressures of the hydraulic servos, taking into consideration the 6→4 shift state (torque sharing) during a shift transitional period. Therefore, engine blow and prolongation are prevented during the 6→3 shift control.

32 Claims, 13 Drawing Sheets

|      | C-1 | C-2 | C-3 | B-1 | B-2 | B-3 | F-1 | F-2 |
|------|-----|-----|-----|-----|-----|-----|-----|-----|
| P    |     |     |     |     |     |     |     |     |
| R    |     |     | ○   |     |     | ○   |     |     |
| N    |     |     |     |     |     |     |     |     |
| 1st  | ○   |     |     |     |     | △   |     | ○   |
| 2nd  | ○   |     |     | △   | ●   |     | ○   |     |
| 3rd  | ○   |     | ○   |     | ●   |     |     |     |
| 4th  | ○   | ○   |     |     | ●   |     |     |     |
| 5th  |     | ○   | ○   |     | ●   |     |     |     |
| 6th  |     | ○   |     | ○   | ●   |     |     |     |

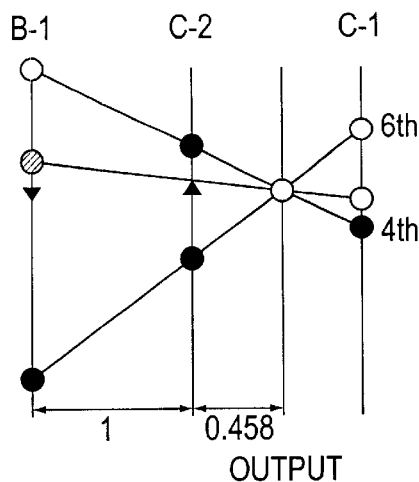
FIG. 9
|  | C-2 | C-1 |
|---|---|---|
| 6th TORQUE SHARING | 1.0 x Tt | 0 |
|  | ↓ | ↓ |
| DURING 6 - 4 SHIFT | Tc2 – 0.64 x Tc1 | Tc1 |
|  | ↓ | ↓ |
| 4th TORQUE SHARING | 0.722 x Tt | 0.433 x Tt |
FIG. 10
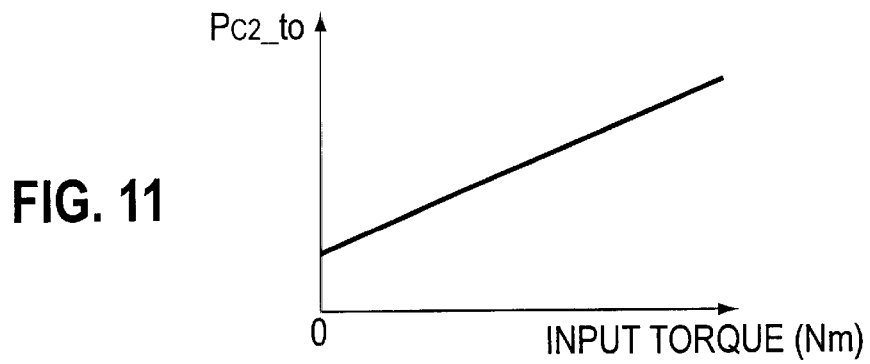
FIG. 11

SPEED SHIFT CONTROL APPARATUS OF AUTOMATIC TRANSMISSION

INCORPORATION BY REFERENCE

The disclosure of Japanese Patent Application No. 2000-399862 filed on Dec. 28, 2000 including the specification, drawings and abstract is incorporated herein by reference in its entirety.

BACKGROUND OF THE INVENTION

1. Field of Invention

The invention relates to a speed shift control apparatus of an automatic transmission and, more particularly, to an art for smoothly performing a speed shift that needs release of two engageable elements and engagement of two different engageable elements (simultaneous engagement switching of two elements) for a shift from one gear speed to another.

2. Description of Related Art

An automatic transmission usually achieves a plurality of gear speeds through changes in gear ratio accomplished by changing a power transfer path extending via speed shift elements formed by planetary gears through engagement and release of friction engageable elements. In order to perform the engagement and release of engageable elements at the time of a speed shift by a simple hydraulic control while suppressing shift shock, the manipulation of engageable elements for upshifts or downshifts is generally performed by a basic operation in which a plurality of engageable elements or a single engageable element is set in the engaged state for a specific gear speed, while another engageable element is engaged or an engageable element in the engaged state is released. However, if the basic operation is not possible due to the gear train construction, an engagement-switching operation is performed in which an engageable element is released from an engaged state while another engageable element is engaged.

In recent years, there has been a trend toward an increase in the number of speeds of an automatic transmission due to demands for improved drivability and energy conservation. Generally, the number of gear speeds of an automatic transmission is increased through addition of a higher gear speed or a lower gear speed by adding an overdrive or underdrive gear to a speed shift mechanism formed by a plurality of planetary gear sets. Another technique of increasing the number of speeds is disclosed in Japanese Patent Application Laid-Open No. HEI 4-219553 in which multiple gear speeds are achieved by providing two systems, that is, high and low systems, of input to a Ravigneaux type planetary gear set.

In a gear train designed for multiple gear speeds, engagement-switching is a complicated operation of four elements instead of the simple engagement-switching operation of two elements due to the increased choices of gear speeds suitable for the state of running of the vehicle. An example in which the four-element engagement-switching operation is needed is a jump shift in which the gear speed is immediately shifted from one of many gear speeds to a specific gear speed. In any case, where an engagement-switching operation of four elements is performed, the control of the sequence and timing of engagement and release of engageable elements is very important. Depending on the fashion of such control, a smooth shift process that occurs in the speed shift mechanism may be impeded, and continuity of speed shift may be lost. In that case, various problems arise, such as, for example, stepwise shocks during a speed shift, a considerably increased shock at the end of a speed shift, a shift duration prolonged more than necessary, etc.

SUMMARY OF THE INVENTION

Accordingly, it is an object of the invention to provide a speed shift control apparatus of an automatic transmission capable of preventing a prolonged speed shift while eliminating occurrence of a shock during a speed shift by achieving a smooth progress of a speed shift if the speed shift requires the engagement and release of four engageable elements.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein:

FIG. 9 is a speed diagram indicating behaviors of the engageable elements during a 6-4 speed shift;

FIG. 10 is a table indicating the torque sharing between the clutch C-2 and the clutch C-1 during the 6-4 speed shift of FIG. 9;

FIG. 11 is an oil pressure characteristic diagram indicating a technique of setting the release oil pressure for the C-2 clutch in accordance with torque;

DETAILED DESCRIPTION OF PREFERRED EMBODIMENTS

Figure 1:
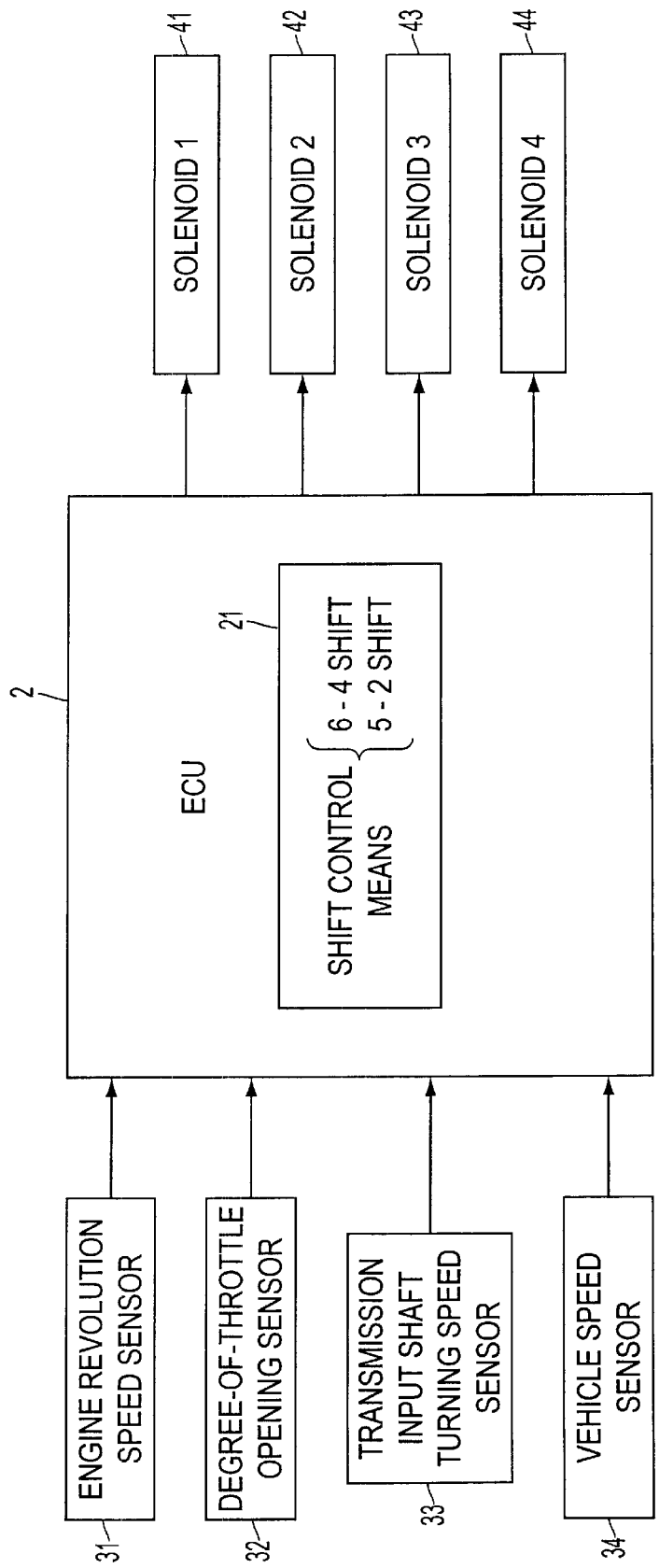
FIG. 1 is a block diagram illustrating a system construction of a signal system of a control apparatus of an automatic transmission in accordance with a first embodiment.

Embodiments of the invention will now be described with reference to the drawings. FIG. 1 illustrates a system construction of a signal system of a control apparatus in a block diagram. The control apparatus has an electronic control unit (ECU) 2 that forms a core of the control apparatus, and various sensors as input means for inputting various information to the electronic control unit 2, including an engine (E/G) revolution speed sensor 31 for detecting the engine revolution speed of the vehicle, a degree-of-throttle opening sensor 32 for detecting the engine load, a transmission input shaft rotation speed sensor 33 for detecting the input rotation of the transmission, and a vehicle speed sensor 34 for detecting the vehicle speed from the rotation of an output shaft of the transmission. The control apparatus further has a plurality of solenoids as output means actuated upon output of a drive signal based on control information, that is, solenoids #1 to #4 as actuators of solenoid valves 41 to 44 disposed in an oil pressure control apparatus described in detail below with reference to FIG. 5.

Figure 2:
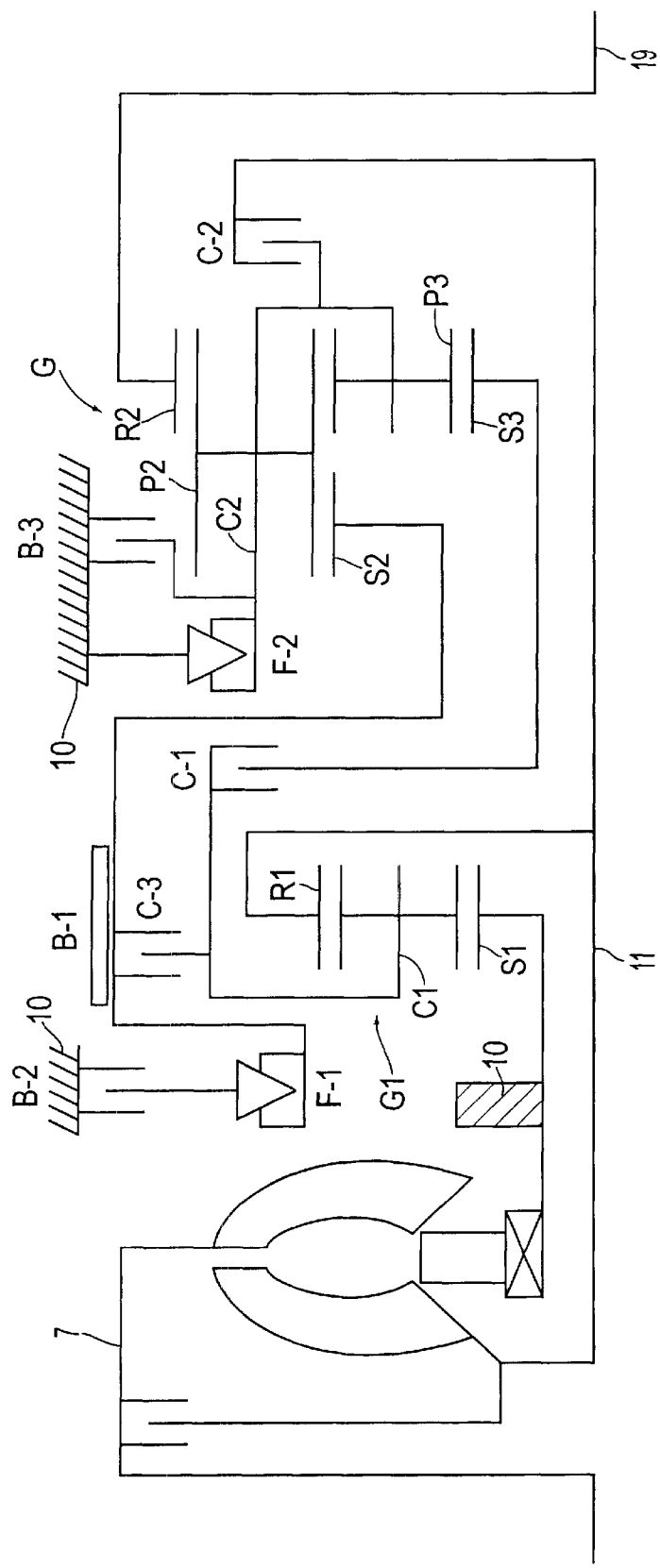
FIG. 2 is a skeleton diagram of a gear train of the automatic transmission.

FIG. 2 illustrates a 6-speed gear train for an FR (front engine, rear wheel drive) type vehicle as an example of a speed shift mechanism controlled by the above-described control apparatus in a skeleton diagram. The gear train includes a torque converter 7 equipped with a lockup clutch, and a speed shift mechanism of six forward speeds and one reverse speed formed by a combination of a Ravigneaux type planetary gear set G and a simple planetary type speed-reducing gear G1.

The planetary gear set G, forming a major portion of the speed shift mechanism, is formed by a Ravigneaux type gear set that includes two sun gears S2, S3 having different diameters, a ring gear R2, long pinion gears P2 externally meshing with the large-diameter sun gear S2 and internally meshing with the ring gear R2, short pinion gears P3 externally meshing with the small-diameter sun gear S3 and externally meshing with the long pinion gears P2, and a carrier C2 supporting the two types of pinion gears P2, P3. The small-diameter sun gear S3 of the planetary gear set G is a multi-plate type clutch (C-1). The large-diameter sun gear S2 is connected to a multi-plate type clutch C-3, and is retainable to an automatic transmission case 10 via a brake B-1 formed by a handbrake, and is also retainable to the automatic transmission case 10 via a one-way clutch F-1 and a multi-plate type brake B-2 that are parallel to the brake B-1. The carrier C2 is connected to an input shaft 11 via a clutch C-2 as a multi-plate type engageable element. The carrier C2 is retainable to the transmission case 10 via a multi-plate type brake B-3, and is retainable to the transmission case 10 via a one-way clutch F-2 in such a manner that rotation of the carrier C2 in one direction is prevented. The ring gear R2 is connected to an output shaft 19.

The speed-reducing planetary gear G1 is formed by a simple planetary gear set. The speed-reducing planetary gear G1 includes a ring gear R1 as an input element connected to the input shaft 11, a carrier C1 as an output element connected to the small-diameter sun gear S3 via a clutch C-1 and connected to the large-diameter sun gear S2 via the clutch C-3, and a sun gear S1 as a fixed element for reaction force which is fixed to the transmission case 10.

Figures 3, 4:
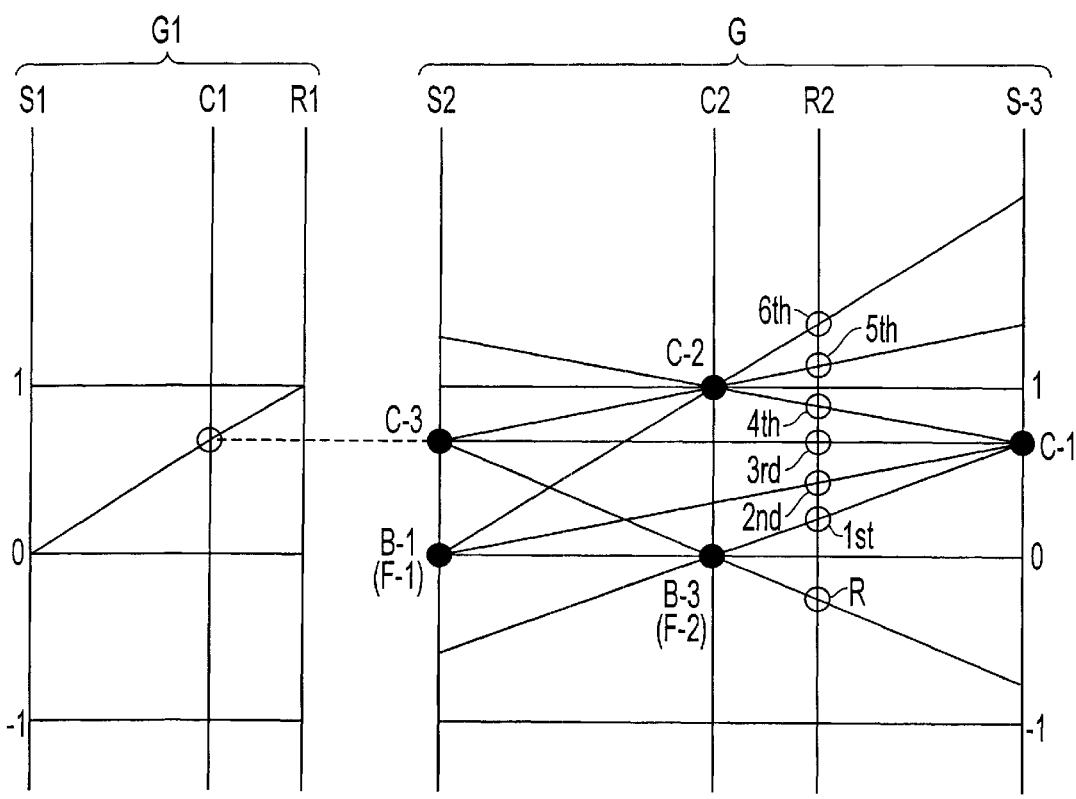
FIG. 3 is an engagement table showing engagement-release relationships between the engageable elements and the gear speeds achieved by the gear train.
FIG. 4 is a speed diagram of the gear train.

The engagement and release of the engageable elements, that is, the clutches, the brakes and the one-way clutches, and the gear speeds achieved thereby in the above-described automatic transmission have relationships as shown in the engagement table of FIG. 3. In the engagement table, symbol "○" indicates engagement, and symbol "Δ" indicates engagement for achieving engine brake, and symbol "●" indicates engagement that does not directly participate in achieving a gear speed, and blanks indicate release. FIG. 4 indicates relationships between the gear speeds achieved by engagement of the clutches, the brakes and the one-way clutches (engagement thereof indicated by "●") and the rotation speed ratios of the speed shift elements in a speed diagram.

As can be understood from FIG. 3 and FIG. 4, the 1st speed (1st) is achieved by engaging the clutch C-1 and the brake B-3 (As can be understood from the operation table, automatic engagement of the one-way clutch F-2 is employed instead of the engagement of the brake B-3 in this embodiment. The engagement of the one-way clutch F-2 is employed in order to avoid a complicated oil pressure control for the engagement switch between the brake B-3 and the brake B-1 at the time of the 1→2 speed shift and to simplify the brake B-3 releasing control. The one-way clutch F-2 releases the engaging force automatically upon engagement of the brake B-1. Thus, this engagement corresponds to the engagement of the brake B-3.). In this case, the speed-reduced rotation from the input shaft 11 via the speed-reducing planetary gear G1 is inputted to the small-diameter sun gear S3 via the clutch C-1. Then, speed-reduced rotation of a maximum-speed reduction ratio of the ring gear R2 is outputted to the output shaft 19, with reaction force provided by the carrier C2 stopped by engagement of the one-way clutch F-2.

The 2nd speed (2nd) is achieved by the engagement of the clutch C-1 and the one-way clutch F-1 corresponding to the brake B-1, and by the engagement of the brake B-2 that effects the engagement of the one-way clutch F-1. The reason why the engagement of these elements corresponds to the engagement of the brake B-1 will be described below. In this case, the speed-reduced rotation from the input shaft 11 via the speed-reducing planetary gear G1 is inputted to the small-diameter sun gear S3 via the clutch C-1. Then, the speed-reduced rotation of the ring gear R2 is outputted to the output shaft 19, with reaction force provided by the large-diameter sun gear S2 stopped by engagement of the brake B-2 and the one-way clutch F-1. The speed reduction ratio in this case is smaller than that of the first speed (1st) as indicated in FIG. 4.

The 3rd speed (3rd) is achieved by the simultaneous engagement of the clutch C-1 and the clutch C-3. In this case, the speed-reduced rotation from the input shaft 11 via the speed-reducing planetary gear G1 is simultaneously inputted to the large-diameter sun gear S2 and the small-diameter sun gear S3 via the clutch C-1 and the clutch C-3. Since the planetary gear set G is thus set in a locked-up state, the rotation of the ring gear R2 equal to the rotations inputted to the large-diameter and small-diameter sun gears is outputted to the output shaft 19 as speed-reduced compared with the rotation of the input shaft 11.

The 4th speed (4th) is achieved by simultaneously engaging the clutch C-1 and the clutch C-2. In this case, the speed-reduced rotation from the input shaft 11 via the speed-reducing planetary gear G1 is inputted to the small-diameter sun gear S3 via the clutch C-1 on one hand. On the other hand, the rotation of the input shaft 11, unreduced in speed, is inputted to the carrier C2 via the clutch C-2. An intermediate rotation between these two rotations is outputted to the output shaft 19 as a rotation of the ring gear R2 that is slightly speed-reduced in comparison with the rotation of the input shaft 11.

The 5th speed (5th) is achieved by simultaneously engaging the clutch C-2 and the clutch C-3.

In this case, the speed-reduced rotation from the input shaft 11 via the speed-reducing planetary gear G1 is inputted to the large-diameter sun gear S2 via the clutch C-3 on one hand, and the rotation, unreduced in speed, inputted from the input shaft 11, via the clutch C-2 is inputted to the carrier C2. Then, a rotation of the ring gear R2 that is slightly speed-increased in comparison with the rotation of the input shaft 11 is outputted to the output shaft 19.

The 6th speed (6th) is achieved by engaging the clutch C-2 and the brake B-1. In this case, the rotation, unreduced in speed, from the input shaft 11, via the clutch C-2, is inputted only to the carrier C2. Then, the speed-increased rotation of the ring gear R2 is outputted to the output shaft 19, with reaction force provided by the sun gear S2 stopped by the engagement of the brake B-1.

The reverse speed (R) is achieved by engaging the clutch C-3 and the brake B-3. In this case, the speed-reduced rotation from the input shaft 11 via the speed-reducing planetary gear G1 is inputted to the large-diameter sun gear S2 via the clutch C-3. Then, the reverse rotation of the ring gear R2 is outputted to the output shaft 19, with reaction force provided by the carrier C2 stopped by the engagement of the brake B-3.

The aforementioned relationship between the one-way clutch F-1 and the brakes B-1 and B-2 will now be described. In this case, the one-way clutch F-1 can be caused to perform substantially the same function as performed by the engagement of the brake B-1, by a setting in which the direction of engagement of the one-way clutch F-1 connected to the sun gear S2 equals the direction of reaction force support provided by the large-diameter sun gear S2 during the second speed. The large-diameter sun gear S2, unlike the carrier C2, is not only engaged to achieve the engine brake effect during the second speed, but is also stopped to achieve the six speed. Therefore, the brake B-1 is needed. Furthermore, as can be understood from the speed diagram of FIG. 4, the large-diameter sun gear S2 turns in a direction opposite to the direction of input rotation when the 1st speed (1st) is achieved. However, when the 3rd or higher speed is achieved, the large-diameter sun gear S2 turns in the same direction as the input rotation direction. Therefore, since the one-way clutch F-1 cannot be directly connected to a fixed member, a construction that allows control of the effectiveness of the one-way clutch F-1 is provided by the in-line arrangement thereof with respect to the B-2 brake.

The gear speeds, achieved as described above, provide a good speed step arrangement in which the intervals between the gear speeds are relatively equal, as can be qualitatively understood by referring to vertical intervals between the symbols "○" indicating the speed ratios of the ring gear R2 in the speed diagram of FIG. 4. This gear train normally does not require multiple engagement switching of engageable elements for upshifts and downshifts between adjacent gear speeds. However, the engagement switching of engageable elements is needed for jump shifts. Examples of the downshifts that necessitate multiple engagement switching include the 6→3 jump shift and the 5→2 jump shift. In these speed shifts, the automatic engagement of the one-way clutch F-1 performs the function of the engagement of the brake B-1 since the brake B-2 is always engaged for the second and higher gear speeds for the sake of simplified control.

Figure 5:
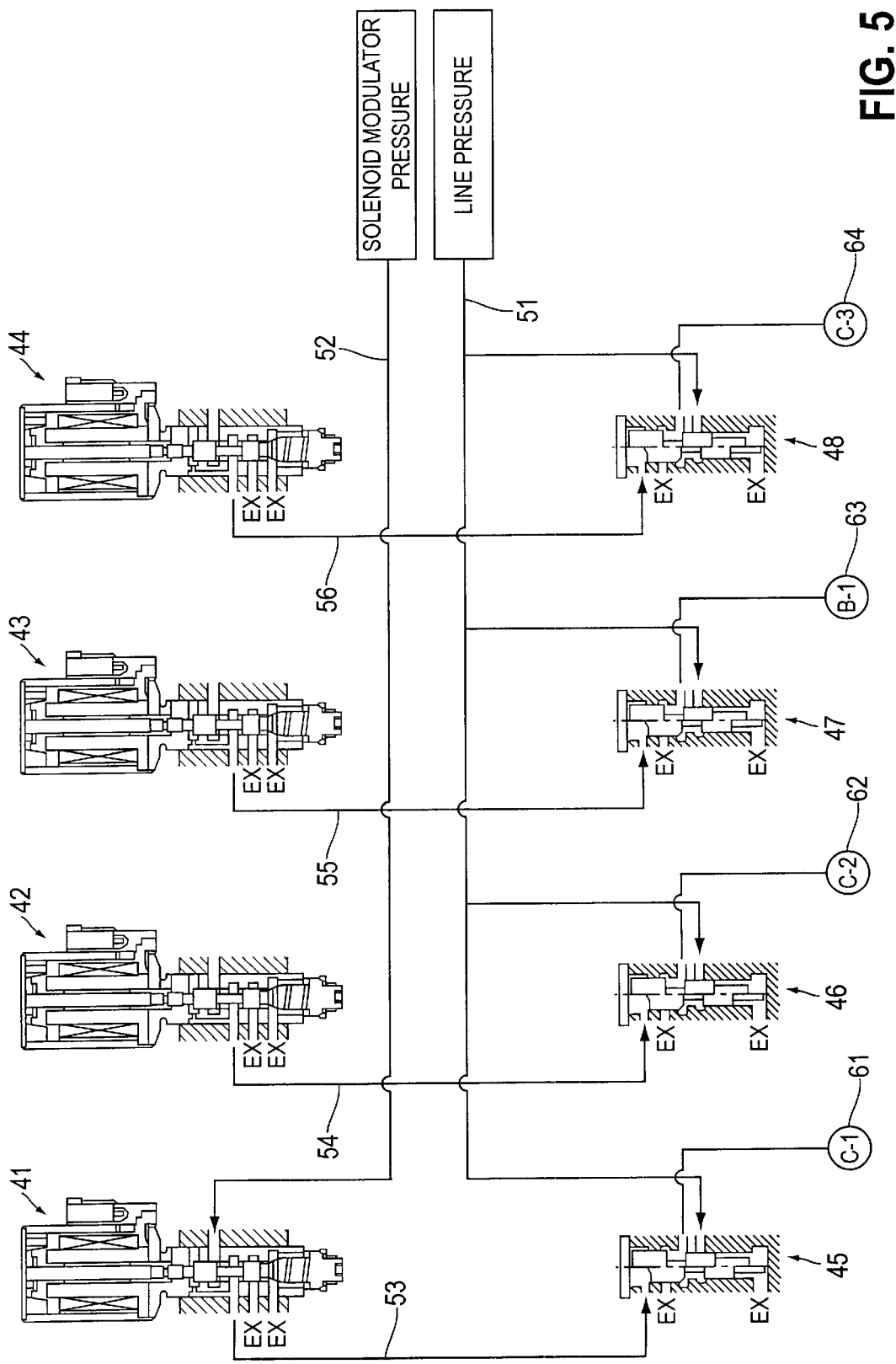
FIG. 5 is a diagram illustrating an oil pressure circuit of an operating system of the control apparatus.

The oil pressure control apparatus for controlling the speed shift mechanism through operations of hydraulic servos of the clutches and the brakes is a construction in which the hydraulic servo of each engageable element is individually and independently controlled directly by a dedicated solenoid valve based on a solenoid drive signal from the electronic control unit 2. FIG. 5 shows a specific construction of the hydraulic circuit. In this hydraulic circuit, control valves 45 to 48 are connected in parallel to a line pressure oil passage 51 connected to a supply circuit of line pressure (maximum circuit pressure that can maintain the engaged state of each engageable element in accordance with the vehicle running load) indicated by a block with its specific construction being omitted from the illustration in FIG. 5. The control valves 45 to 48 are actuated for pressure regulation in accordance with the solenoid pressures applied thereto by their respective solenoid valves 41 to 44.

Specifically, a hydraulic servo 61 of the clutch C-1 is connected to the line pressure oil passage 51 via the control valve 45. A spool end of the control valve 45 is connected, via the solenoid valve 41, to an oil passage 52 of solenoid modulator pressure (which is an oil pressure obtained by reducing the line pressure via a modulator valve in order to increase the pressure regulation gain provided by the solenoid valve). The control valve 45 is a spool valve that has, at two ends, lands whose diameters are different from each other.

The control valve 45 operates as follows. By applying a solenoid signal pressure to the large-diameter land end overcoming the spring load on the small-diameter land end, the large-diameter land is caused to close a drain port. The line pressure oil passage 51 and the hydraulic servo 61 are connected in communication while the small-diameter land is caused to perform a throttling function between an in-port connected to the line pressure oil passage 51 and an out-port connected to the hydraulic servo 61. By releasing the solenoid pressure, the small-diameter land is caused to close the in-port, and the large-diameter land is cause to open the drain port, so that the hydraulic servo 61 is connected to the drain.

The solenoid valve 41 is a normally-open type linear solenoid valve which operates as follows. The throttling between the solenoid modulator pressure oil passage 52 and a solenoid pressure oil passage 53 is adjusted by the load applied onto a plunger overcoming the spring load on an end of a spool having lands at two ends. Furthermore, the amount of drain in the solenoid pressure oil passage 53 is adjusted so as to adjust the solenoid pressure.

As shown in FIG. 5, the clutch C-2, the brake B-1 and the clutch C-3 are also provided with similar control valves 46, 47, 48, solenoid valves 42, 43, 44 and solenoid pressure oil passages 54, 55, 56, respectively, thus forming a parallel circuit construction.

The automatic transmission, constructed as described above, requires the operation of four engageable elements (the clutch C-1, the clutch C-2, the clutch C-3 and the brake B-1) for the 6→3 speed shift in which a first gear speed is the 6th speed and a second gear speed is the 3rd speed, which is three speeds apart from the 6th speed. In this case, the first gear speed (6th speed) is achieved by the engagement of first and second engageable elements (the brake B-1 and the clutch C-2). The second gear speed ($3^{rd}$ speed) is achieved by the engagement of third and fourth engageable elements (the clutch C-1 and the clutch C-3). However, if a speed shift in which the existing engagement of engageable elements is entirely replaced by an engagement of different engageable elements, as described above, is performed by a single shift operation, a disordered shift operation may occur in the speed shift mechanism, and may result in an uncontrollable state. In this embodiment, therefore, a control is performed in which the first gear speed is shifted to the second gear speed via a third gear speed that is a transitional intermediate gear speed so that engageable elements are replaced one at a time. In the aforementioned example, the third gear speed is the 4th speed. The speed shift where the first gear speed is the 5th speed, and is shifted to the 2nd speed, which is two speeds apart from the 5th speed, also needs operation of four engageable elements (the clutch C-1, the clutch C-2, the clutch C-3 and the one-way clutch F-1). In this case, the first engageable element is the clutch C-2, and the second engageable element is the clutch C-3, and the third engageable element is the clutch C-1, and the fourth engageable element is the one-way clutch F-1. The intermediate gear speed is the 3rd speed.

To prepare for the above-described shifts, the speed shift control apparatus in accordance with the invention includes shift control means 21 (see FIG. 1) for controlling the state of the second engageable element (the clutch C-2) in accordance with the states of the first and third engageable elements (the brake B-1 and the clutch C-1). These engageable elements are controlled by oil pressures of the hydraulic servos 61 to 64.

The state of an engageable element herein refers to a transitional state from engagement to release or from release to engagement, and the release and the engagement include transitional slip states preceding complete release and complete engagement. Therefore, starting the release of an engageable element means starting a slip of the engageable element. With regard to the engageable elements that are hydraulically operated, start of the release means start of slip due to reduced engaging force. With regard to the one-way clutches, which are not hydraulically operated, start of the release means becoming free with a change of a rotating member in the rotational direction. Similarly, completion of the engagement of an engageable element means discontinuation of slip of the engageable element. Therefore, completion of the engagement means discontinuation of slip due to increased engaging force in the case of the engageable elements that are hydraulically operated. In the case of the one-way clutches F-1 and F-2, which are not hydraulically operated, completion of the engagement means becoming locked with a change of the rotating member in the rotational direction.

Next, a specific construction of the shift control means 21 will be described in conjunction with the 6→3 speed shift as an example. In this embodiment, the shift control means 21 is provided as a program in the control apparatus. Speed shifts are performed through control of the oil pressures of the hydraulic servo 61 to 64 of the engageable elements based on operation of the solenoid valves 41 to 44 in accordance with solenoid drive signals outputted based on the program. The flow of control of the shift control means 21 will be described below separately for each engageable element.

Figure 6:
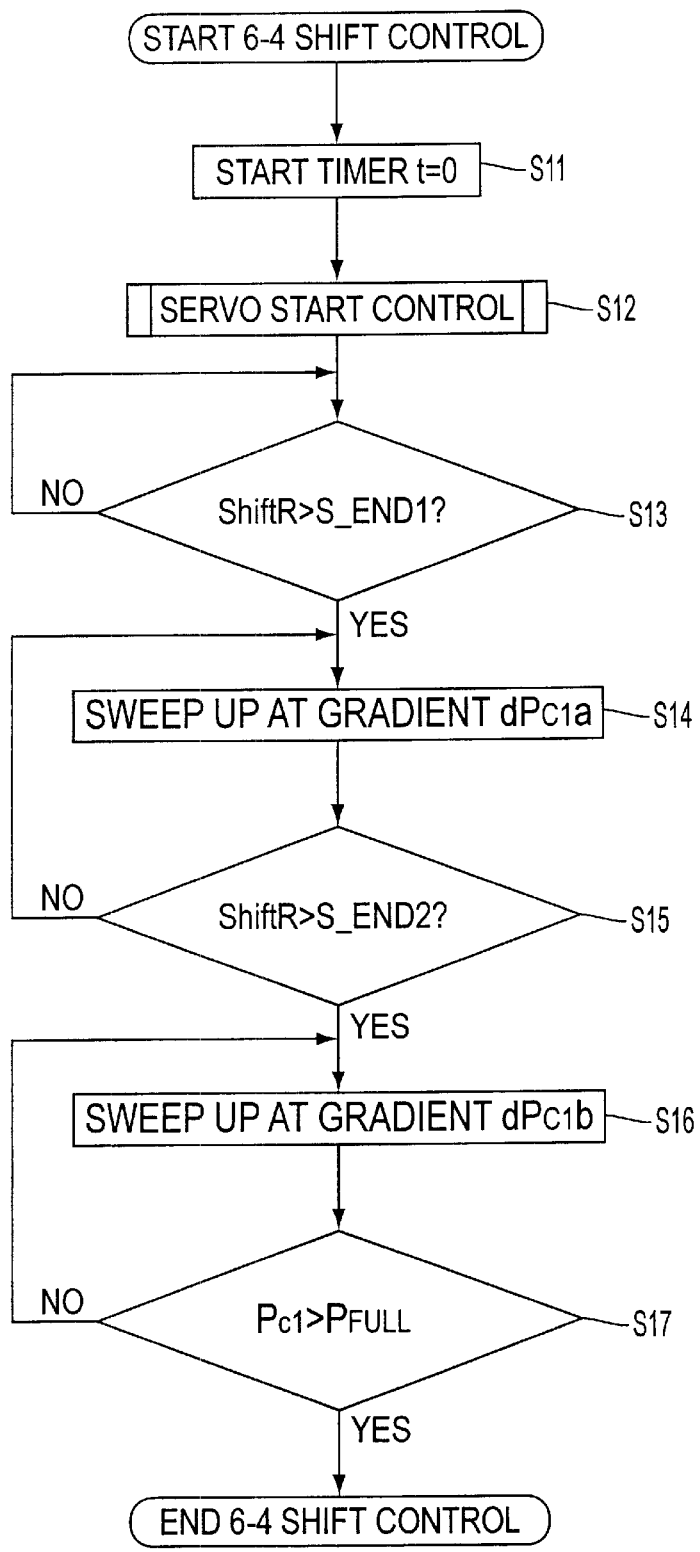
FIG. 6 is a flowchart illustrating a clutch C-1 engagement control for a 6→3 speed shift.

Firstly, a control of engaging the clutch C-1 as the third engageable element controlled with no particular relation to the states of other engageable elements will be described with reference to the flowchart of FIG. 6.

C-1 Engagement Control

In this control, a timer is started in step S11 (timer started at t=0). Subsequently in step S12, a servo starting control sub-routine process is performed. This process is a process of performing a first fill of an oil pressure to fill the hydraulic servo cylinder of the clutch C-1 and maintaining the subsequent piston stroke pressure to reduce the gap between the hydraulic servo piston and the friction member of the engageable element, which is a well known process that is normally performed to engage a clutch. Subsequently in step S13, a state of progress (Shift R) as an index for determining the progress of the shift is determined (Shift R>S_End 1). As for the state of progress of shift (Shift R), the index for determination may be the input shaft rotation speed or the oil pressure of the hydraulic servo. In this embodiment, using the rotation speeds of the input and output shafts as indices, the state of progress (Shift R) is expressed in:

Shift R=(transmission input rotation speed−pre-shift gear ratio× transmission output rotation speed)×(100/(transmission output rotation speed×(post-shift gear ratio−pre-shift gear ratio)) %.

This determination is initially negative ("No"). This determination step is repeated until the determination becomes affirmative as the shift progresses. When the aforementioned determination becomes affirmative ("Yes"), a pressure increase (sweep-up with a gradient of $dP_{C_1}a$) is started in step S14 in order to start engaging the clutch C-1. Specifically, this process means a process of controlling the value of drive signal current to the solenoid #1 to cause the pressure regulation operation of the solenoid valve 41 and increasing the oil pressure of the hydraulic servo provided by the control valve 45 with a gradient of $dP_{C_1}a$. This pressure will be termed C1 pressure as a combination with the abbreviation symbol of the hydraulic servo in the below description of the embodiment. This manner of abbreviation applies to the oil pressures of the hydraulic servos of the other engageable elements as well. The relationship between the drive signal and the servo pressure remains the same in all the oil pressure controls described below. While the pressure increase is continued, it is determined in step S15 whether the shift has reached a pre-4th speed synchronization state (Shift R>S_End 2), for example, 90%, from the state of process of the shift (Shift R). This determination is initially negative as well. Therefore, the loop returning to step S14 is repeated to continue the sweep-up until the determination becomes affirmative as the shift progresses. After the determination in step S15 becomes affirmative, a process of increasing the C1 pressure to the line pressure (sweep-up with a gradient $dP_{C_1}b$) is performed in step S16 in order to reliably maintain the engagement of the clutch C-1. While this process is performed, it is repeatedly determined in step S17 whether the C1 pressure has reached the line pressure ($P_{C_1}>P_{FULL}$). After the determination in step S17 becomes affirmative, the 6-4 speed shift control for the clutch C-1 engagement control ends.

Figure 7:
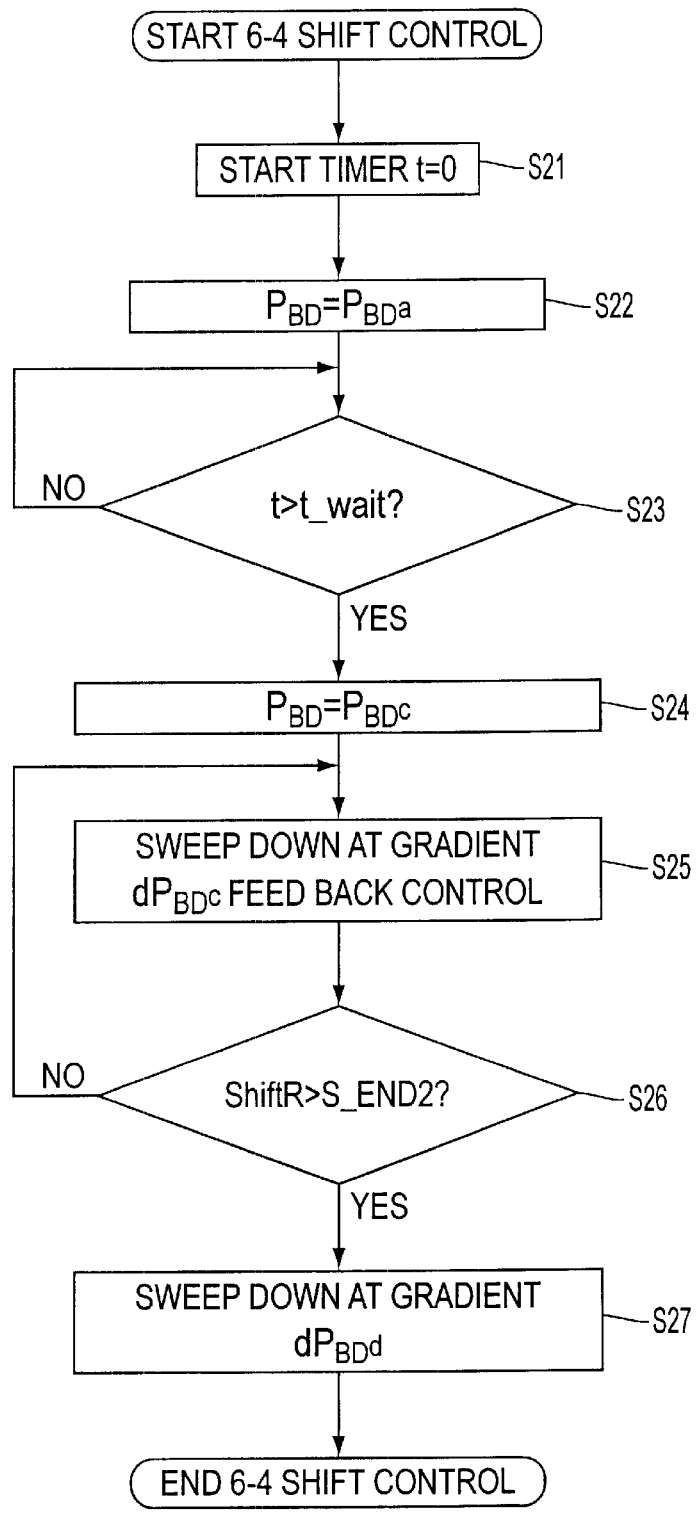
FIG. 7 is a flowchart illustrating a brake B-1 release control for the 6→3 ; speed shift.

FIG. 7 illustrates a flow of a control of releasing the brake B-1 as the first engageable element.

B-1 Release Control

This control starts simultaneously with the 6-4 speed shift control for the clutch C-1 engagement control described above. As in the above-described control, a timer is started in step S21 (timer started at t=0). Subsequently in step S22, a process of temporarily keeping the B1 pressure at a predetermined pressure that is slightly lower than the oil pressure needed for the engagement ($P_{B1}=P_{B1}a$) is performed. This process is performed to prevent engine racing from being caused by inconsistent operations of the clutch C-1 due to individual variations from one transmission apparatus to another and variations with time. The duration of the predetermined pressure is monitored by the subsequent step S23. The predetermined pressure is maintained until the determination in step S23 becomes affirmative (timer t>t_wait). After the elapse of the timer duration, a brake B-1 release starting process of rapidly reducing the B1 pressure to a predetermined pressure ($P_{B1}=P_{B1}c$) is performed in step S24. Subsequently in step S25, a process of gradually reducing the B1 pressure (feedback control together with sweep-down at a gradient $dP_{B1}c$) is performed. In step S26, the degree of progress of the shift (Shift R) is determined. In this case, too, the determination regarding the degree of progress is initially negative, and the loop returning to step S25 is repeated. In this B1 pressure reducing process, pressure reduction which is not a simple sweep-down but is related to the torque capacity of the clutch C-2 is performed, due to the relationship with the clutch C-2 release control described below. After the determination regarding the degree of progress in step S26 becomes affirmative (Shift R>S_End 2), a low pressure process for completely removing the B1 pressure (sweep-down at a gradient $dP_{B1}d$) is performed in step S27. This process automatically comes to completion when the solenoid valve #3 reaches the full output. Therefore, without performing any particular monitoring determination, the 6-4 speed shift control for releasing the brake B-1 ends.

Figure 8:
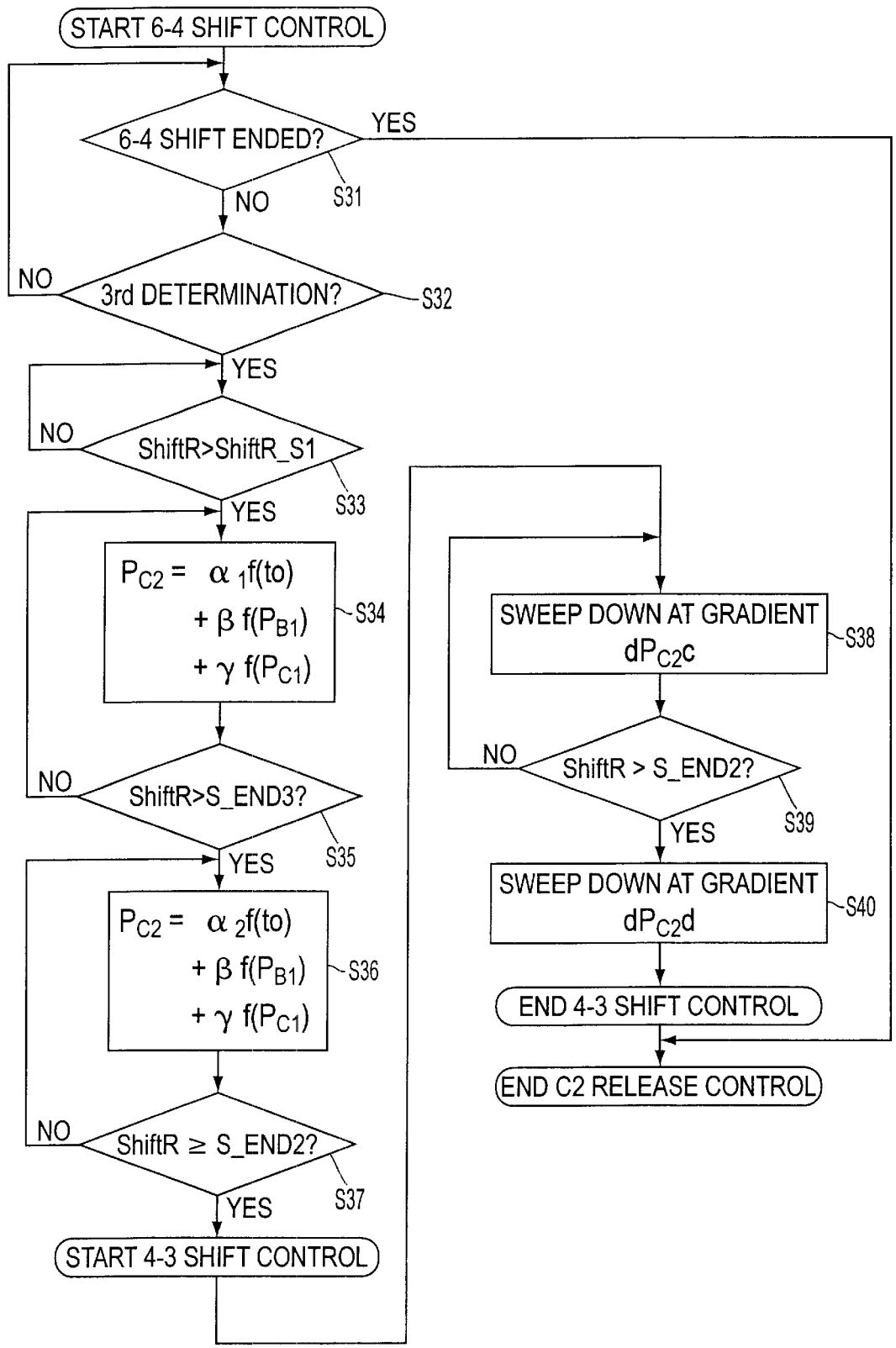
FIG. 8 is a flowchart illustrating a clutch C-2 release control for the 6→3 speed shift.
Figure 12:
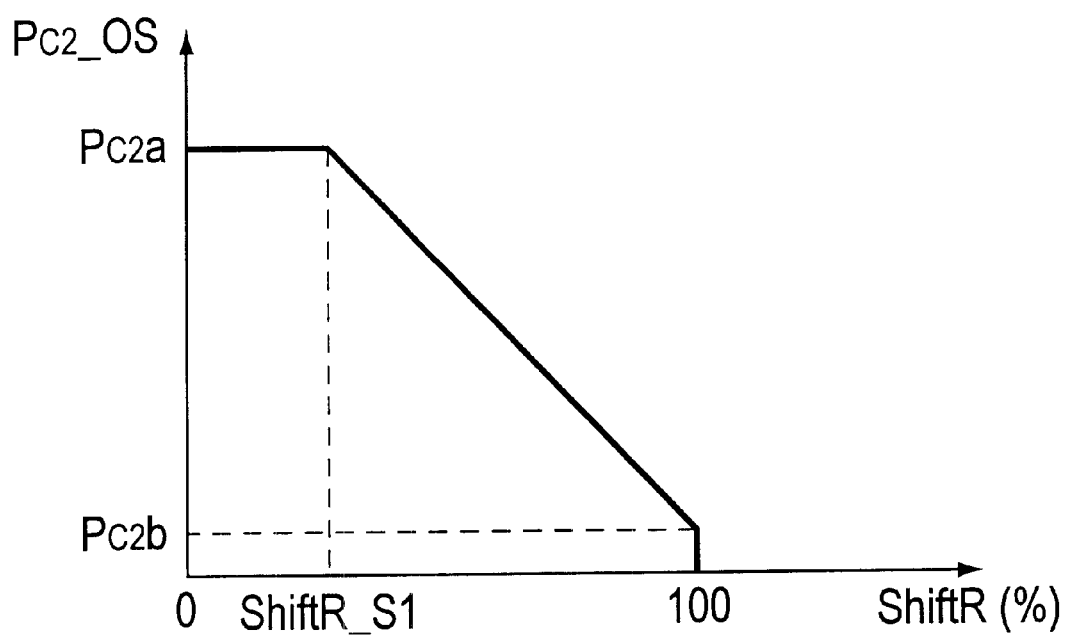
FIG. 12 is an oil pressure characteristic diagram indicating a technique of setting a safety factor-corresponding amount of the clutch C-2 release oil pressure.

FIG. 8 illustrates a flow of a control of releasing the clutch C-2, which is the second engageable element.

C-2 Release Control

If the 6-4 speed shift has ended before this control process, the clutch C-2 release control would become an inappropriate control. To exclude such a case, determination regarding the end of the 6-4 speed shift is performed in the first step S31. If the determination is affirmative, the subsequent steps are skipped to end the clutch C-2 release control. If the aforementioned case is excluded, it is determined in step S32 whether a command for shift to the third gear speed has been established (third determination). This process accomplishes distinguishment from shifts to other gear speeds. After it is confirmed that execution of this control is appropriate, determination regarding the state of progress of the shift (Shift R) for determining a timing of starting the release of the clutch C-2 is started in step S33. The index for determination regarding the state of progress of the shift in this case is a value (Shift R_S1) based on the rotation speed of the transmission input shaft. After the determination becomes affirmative (Shift R>Shift R_S1), a low-pressure control with respect to the C2 pressure ($P_{C2}$= $\alpha_1 f(to) + \beta f(P_{B1}) + \gamma f(P_{C1})$), which is a feature of the invention, is executed in step S34. In this equation, $\alpha$, $\beta$, $\gamma$ are gains used for calculation of the individual oil pressures. The term $\alpha_1 f(to)$ is a C2 pressure needed for the engagement with respect to the input torque during the 6th speed state, that is, a reference oil pressure in the invention. The term $\beta f(P_{B1})$ is a C2 pressure correction amount needed to maintain the 6th speed state without allowing a slip of the clutch C-2 with respect to changes in the B1 pressure of the brake B-1, that is, a first correction oil pressure in the invention. The term $\gamma f(P_{C1})$ is a C2 pressure correction amount corresponding to the change in the clutch C-2-assigned torque with respect to the change in the C1 pressure of the clutch C-1, that is, a second correction oil pressure in the invention.

The calculation of the C2 pressure will be further described. In this control, the C2 pressure is calculated in accordance with the input torque, as a sum of the needed oil pressure for maintaining the 6th speed state, the amount of correction corresponding to the first correction oil pressure provided in accordance with the increase in the torque capacity of the brake B-1, and the amount of correction corresponding to the second correction oil pressure provided in accordance with the increase in the torque capacity of the clutch C-1. Referring to the speed diagram of FIG. 9, at the time of the 6-4 speed shift that is a power-on downshift, the clutch C-1 does not have a capacity but the brake B-1 and the clutch C-2 have capacities during an early period of transition to the 4th speed state. Therefore, in terms of torque sharing, the 6th speed state is considered to still remain during this period. If during this state, the B1 pressure is minutely increased by a feedback control, the brake B-1 operates so as to reduce the rotation, so that a movement is induced in the direction indicated by an arrow in FIG. 9. Due to this movement, the clutch C-2 is affected by the brake B-1, and will slip if the clutch C-2 does not have a capacity that overcomes the effect of the brake B-1 in addition to the capacity for transferring the input torque. Assuming that the output rotation remains constant during the speed shift and that the brake B-1 transfers a torque $T_{B1}$ [Nm] for a feedback, an equation:

$$T_{B1} \times (1+0.458) = dT_{C2} \times 0.458$$

is obtained for a balance. Therefore, the clutch C-2 must have a torque capacity increase of:

$$dT_{C2} = 3.18 \times T_{B1} [Nm]$$

Then, after the feedback control of the brake B-1 ends and the clutch C-1 comes to have a capacity, the torque sharing shifts from the 6th speed state to the 4th speed state. Referring to FIG. 10, increases and decreases in the C2 pressure are determined by linear interpolation, assuming that the capacity increases at a constant rate with regard to the effect of the clutch C-1 capacity. As a result, the torque capacity of the clutch C-2 is changed with respect to an increase in the capacity of the clutch C-1. In this case, a transition state of $((T_{C1} \div 0.433 \, Tt) \times 100)$ % is in progress, wherein Tt is the input torque and $T_{C1}$ is the torque capacity [Nm] of the clutch C-1. The amount of change in the torque capacity of the clutch C-2 at that time is:

$$(0.722Tt - 1.0Tt) \times (T_{C1} \div 0.433Tt) = -0.64 T_{C1}$$

The input torque used in the aforementioned calculation of the oil pressure can be determined by determining the engine torque from a map of the degree of throttle opening and the engine revolution speed, and determining the speed ratio from the input rotation speed and the output rotation speed of the torque converter, and multiplying the engine torque by the speed ratio. The conversion of the input torque into the oil pressure is accomplished by dividing the input torque by the multiplication product of the pressure-receiving area of the piston of the hydraulic servo of the engageable element concerned, the number of friction members, the effective radius thereof and the friction coefficient thereof, and by adding the value from the division to the piston stroke pressure. In this case, the C2 pressure ($P_{C2}$_to) needed for the engagement with respect to the input torque is set so as to linearly increase with the input torque, as indicated in FIG. 11.

In this control, an oil pressure ($P_{C2}$_OS) corresponding to the safety factor is added to the oil pressure corresponding to the input torque. This oil pressure is decreased from $P_{C2}a$ to $P_{C2}b$ in accordance with the state of progress of the shift (Shift R) from Shift R_S1 to 100%. If the value of $P_{C2}$ is "0", the release (slip) of the clutch C-2 starts. However, in this case, a setting is made such that the value of $P_{C2}b$ does not become completely equal to "0" even when the state of progress of the shift reaches 100%.

While the low pressure process is being executed, determination regarding the state of progress of the shift (Shift R) for determination regarding a state preceding the 4th speed synchronization is performed (Shift R>S_End 3) in step S35. After the pre-synchronization state determination becomes affirmative, a low pressure control in accordance with the torque of the 4th speed in the second stage (PC2= $\alpha_2 f(to)+\beta f(P_{B1})+\gamma f(P_{C1})$) is executed in step S36. As in the aforementioned case, $\alpha$, $\beta$, $\gamma$ in this case are gains used for calculation of the individual oil pressures. The term $\alpha_1 f(to)$ is a C2 pressure needed for the engagement with respect to the input torque during the 6th speed state. The term $\beta f(P_{B1})$ is a C2 pressure correction amount needed to maintain the 6th speed state without allowing a slip of the clutch C-2 with respect to changes in the B1 pressure. The term $\gamma f(P_{C1})$ is a C2 pressure correction amount needed for the shift to the 4th speed state in accordance with the change in the clutch C-2-assigned torque with respect to the change in the torque capacity of the clutch C-1, that is, the C1 pressure. In this case, the determination regarding the state of progress of the shift (Shift R) for determination regarding the state preceding the 4th speed synchronization is performed (Shift R>S$_{13}$ End 2) in step S37, as in the aforementioned case of the low pressure. After the pre-synchronization determination becomes affirmative, the 4-3 speed shift control is started.

In the low pressure control in step S36, although not shown in the flowchart, the C2 pressure in an initial period of the start of the low pressure (waiting pressure) is preferably set to a relatively high value, taking safety into account, in order to avoid an excessively early start of the slip of the clutch C-2 with respect to the affirmative determination regarding the state preceding the 4th speed synchronization. However, an excessively high setting may cause an inconveniently increased time of the speed shift. Therefore, in this case, a guard oil pressure (Pdw) determined in accordance with the input torque is set. After the guard pressure (Pdw) and the oil pressure are calculated as described above are compared, the greater one of the values is set as the waiting pressure of the C2 pressure ($P_{C2}$wait=Max($\alpha_2 f(to)+\beta f(P_{B1})+\gamma f(P_{C1})$, Pdw).

In step S38, that is, the initial step in the 4-3 speed control, a process of sweeping down the C2 pressure ($P_{C2}$) at a gradient of $dP_{C2}c$ is performed. While this process is performed, determination regarding the state of progress of the shift (Shift R) is performed (Shift T>S_End 2) in step S39. Until this determination becomes affirmative, the sweep-down is continued. After the determination becomes affirmative, a low pressure process (sweep-down at a gradient of $dP_{C2}d$) is performed in step S40 as a final process, in order to completely remove the C2 pressure. This process also comes to completion automatically when the solenoid valve 42 reaches the full output. Therefore, without any particular monitoring determination, the 4-3 shift control for releasing the clutch C-2 is ended. The clutch C-2 release control is thus ended.

Figure 13:
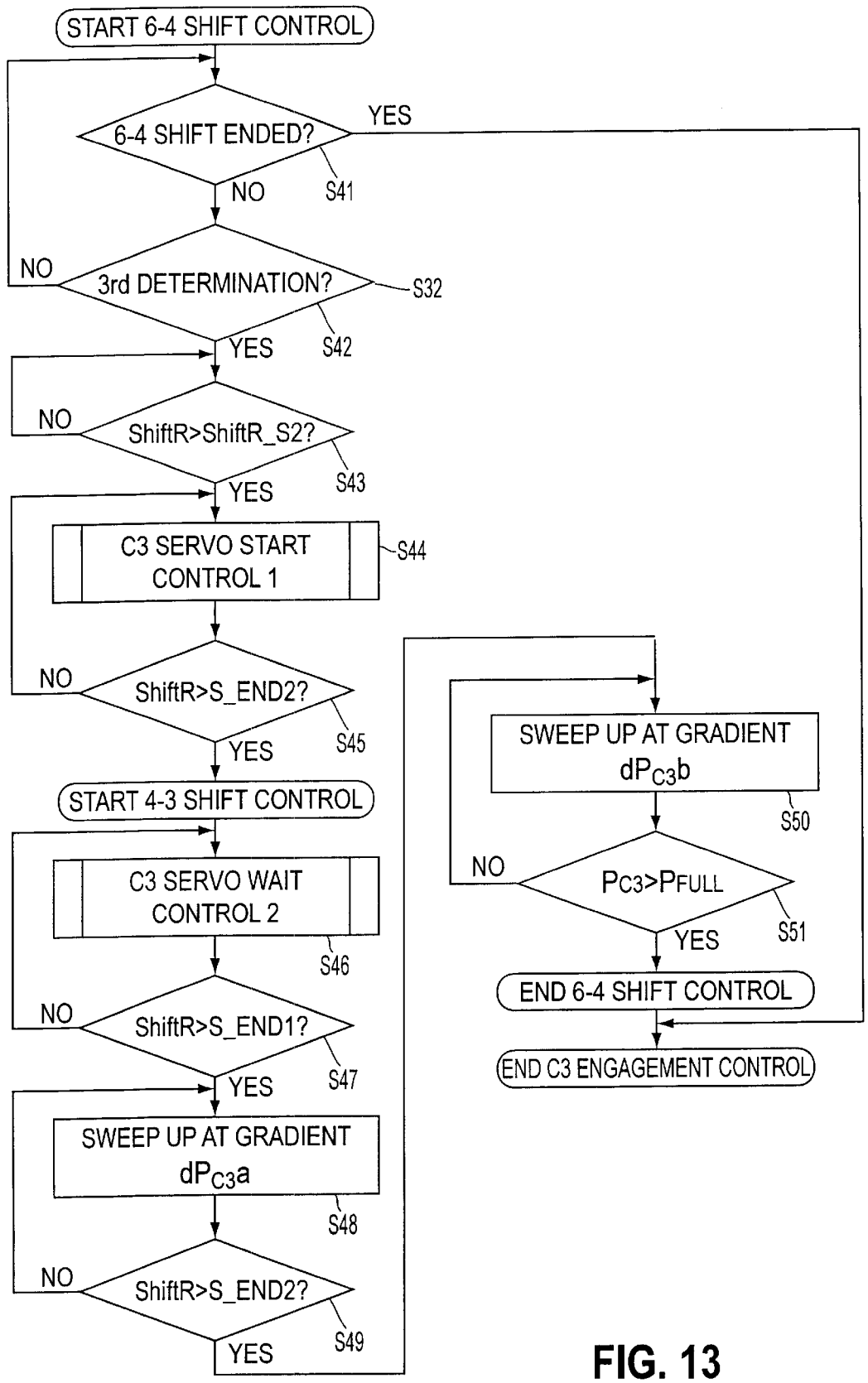
FIG. 13 is a flowchart illustrating a clutch C-3 engagement control for the 6→3 speed shift.

FIG. 13 illustrates a flow of a control of engaging the clutch C-3, that is, the fourth engageable element.

C-3 Engagement Control

Similarly to the above-described release control of the clutch C-2, if the 6-4 speed shift has ended before the clutch C-3 engagement control process, the clutch C-3 engagement control would become an inappropriate control. Therefore, in order to exclude such a case, determination regarding the 6-4 speed shift is performed in the initial step S41. If the determination is affirmative, the subsequent steps are skipped to end the clutch C-3 engagement control. If the aforementioned case is excluded, it is determined in step S42 whether a command for shift to the third gear speed has been established (third determination). This process accomplishes distinguishment from shifts to other gear speeds. After it is confirmed that execution of this control is appropriate, determination regarding the state of progress of the shift (Shift R) for determining a timing of starting the engagement of the clutch C-3 is started in step S43. After this determination becomes affirmative (Shift R>Shift R_S2), a subroutine process of the servo starting control 1 is executed in step S44. This is a process of performing a first fill of an oil pressure to fill the hydraulic servo cylinder of the clutch C-3 and maintaining the subsequent piston stroke pressure to reduce the gap between the hydraulic servo piston and the friction member of the engageable element, which is a well known process that is normally performed to engage a clutch. Subsequently in step S45, a state of progress (Shift R) as an index for determining the progress of the shift is determined (Shift R>S_End 2). The state of progress of the shift (Shift R) is as described above. This determination is initially negative ("No"). This determination step is repeated until the determination becomes affirmative as the shift progresses. When the aforementioned determination becomes affirmative ("Yes"), the 4-3 speed shift control is started, and a subroutine process of the servo waiting control 2 at the second stage is performed. In step S47, determination regarding the state of progress of the shift in the 4-3 speed shift is repeatedly performed (Shift R>S_End 1). After this determination becomes negative, a pressure increase for engaging the clutch C-3 (sweep-up at a gradient of $dP_{C3}a$) is started in step S48. Then, while this pressure increase is continued, it is determined in step S49 whether the 3rd speed synchronization is reached (Shift R>S_End 2) based on the state of progress of the shift (Shift R). This determination is also initially negative, and the loop returning to step S48 is repeated to continue the sweep-up until the determination becomes affirmative as the shift progresses. After the determination in step S49 becomes affirmative, a process of increasing the C3 pressure to the line pressure (sweep-up with a gradient $dP_{C3}b$) is performed in step S50 in order to reliably maintain the engagement of the clutch C-3. While this process is performed, it is repeatedly determined in step S51 whether the C3 pressure has reached the line pressure ($P_{C3}>P_{FULL}$). After the determination in step S51 becomes affirmative, the 6-4 speed shift control ends, and the clutch C-3 engagement control ends.

Figure 14:
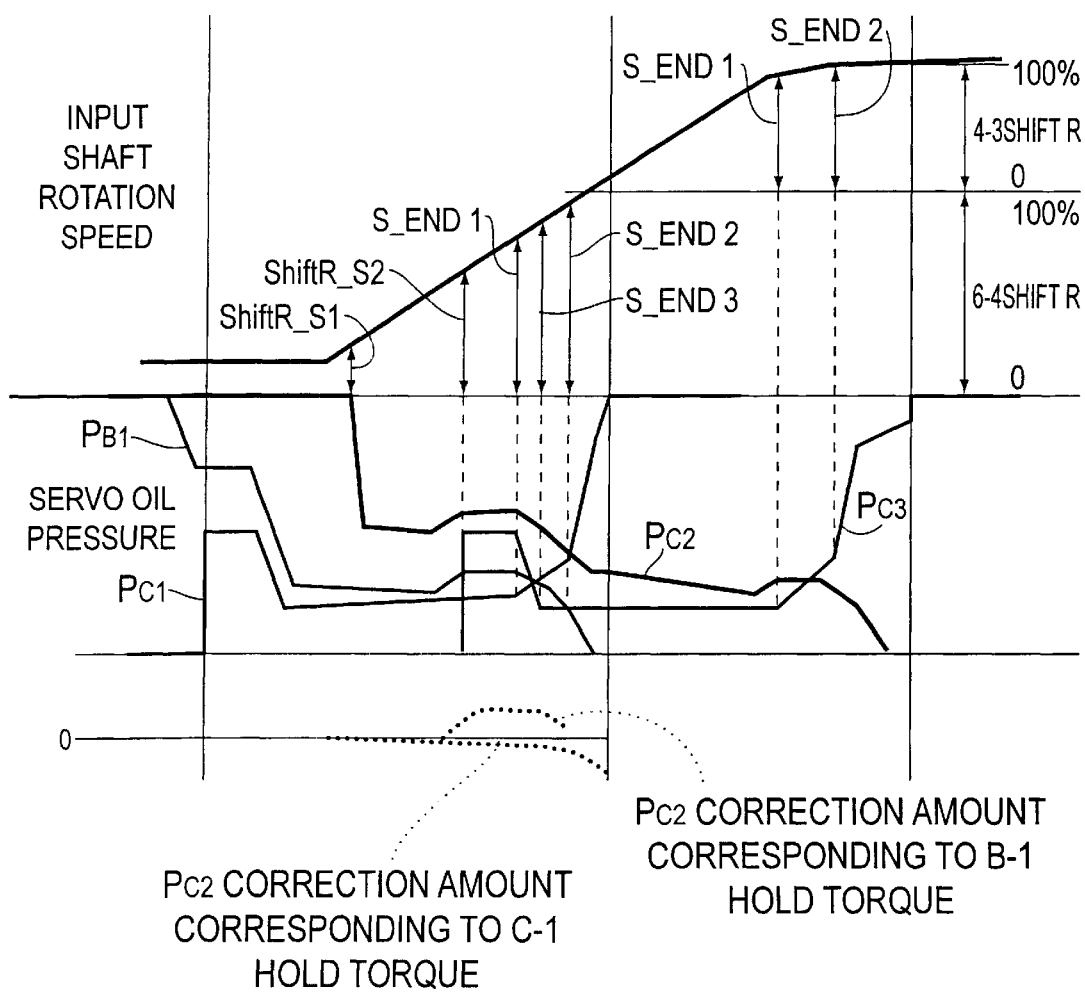
FIG. 14 is a time chart indicating a relation in control among the engageable elements for the 6-3 speed shift.

The operations of the four engageable elements in the 6→3 speed shift control are indicated in the form of a relationship between the servo oil pressure and the input shaft rotation speed in the time chart of FIG. 14. As indicated in the chart, the engagement control of the clutch C-1 and the release control of the brake B-1 are simultaneously started. The C1 pressure ($P_{C1}$) is raised to the first fill pressure. At the same time, the B1 pressure ($P_{B1}$) is set to a low pressure that is slightly lower than the line pressure, and is then reduced to a predetermined pressure for starting the release. As a result, the 6-4 speed shift is started, so that the input shaft rotation speed starts to rise. Then, the B1 pressure ($P_{B1}$) is initially reduced at a constant gradient in accordance with the sweep-down. The C1 pressure ($P_{C1}$) is held at the piston stroke pressure, so that the clutch C-1 assumes an engagement waiting state.

Then, when a clutch C-2 release control starting timing (Shift R_S1) is reached based on the increase in the input shaft rotation speed, the C2 pressure ($P_{C2}$) is instantly reduced to an oil pressure that is not so low as to start release (slip). After that, the C2 pressure ($P_{C2}$) is reduced at a predetermined gradient. The 6-4 speed shift to the 4th speed synchronization progresses. Approximately when the clutch C-1 starts to slip and starts to have a torque capacity, the B1 pressure ($P_{B1}$) is slightly increased by the feedback control in accordance with the input rotation acceleration, and the C2 pressure ($P_{C2}$) is similarly slightly increased. Then, when a clutch C-3 servo start control starting timing (Shift R_S2) is reached based on the input shaft rotation speed, the C3 pressure ($P_{C3}$) is increased to the first fill pressure.

Thus, the input rotation shifts from the state of the 6th speed to the state of the 4th speed. When it is determined that the 6-4 Shift R preceding the 4th speed synchronization has reached 70% (S_End 1) based on the input shaft rotation speed, the C1 pressure ($P_{C1}$) is increased, and the clutch C-1 engagement (slip) further progresses. Then, when the clutch C-1 reaches 90% of the operation preceding the completion of the engagement, the determination regarding a state preceding the 4th speed synchronization based on the input shaft rotation speed (S_End 2) becomes affirmative, so that the C1 pressure ($P_{C1}$) is increased to the line pressure. On the other hand, the C2 pressure ($P_{C2}$) under the decrease control has been controlled, due to the reducing control, so that the C2 pressure reaches an oil pressure that is suitable for reaching a state preceding the start of release when determination regarding the state preceding the 4th speed synchronization becomes affirmative (S_End 3). Therefore, a control state at the second stage wherein the gradient is changed from that at the previous stage is established. The oil pressure control in accordance with the progress of the engagement of the clutch C-3 is substantially the same as the oil pressure control for the clutch C-1, except that the determinations regarding the 70% progress and the state preceding the synchronization are performed with respect to the 3rd speed instead. Then, when the 3rd speed synchronization is reached as the 4-3 speed shift progresses, the servo oil pressure of the clutch C-2 is completely released, and the servo oil pressure of the clutch C-3 is increased to the line pressure. In this manner, the 6→3 speed shift is accomplished in the form of a continuous 6-4-3 speed shift.

Figure 15:
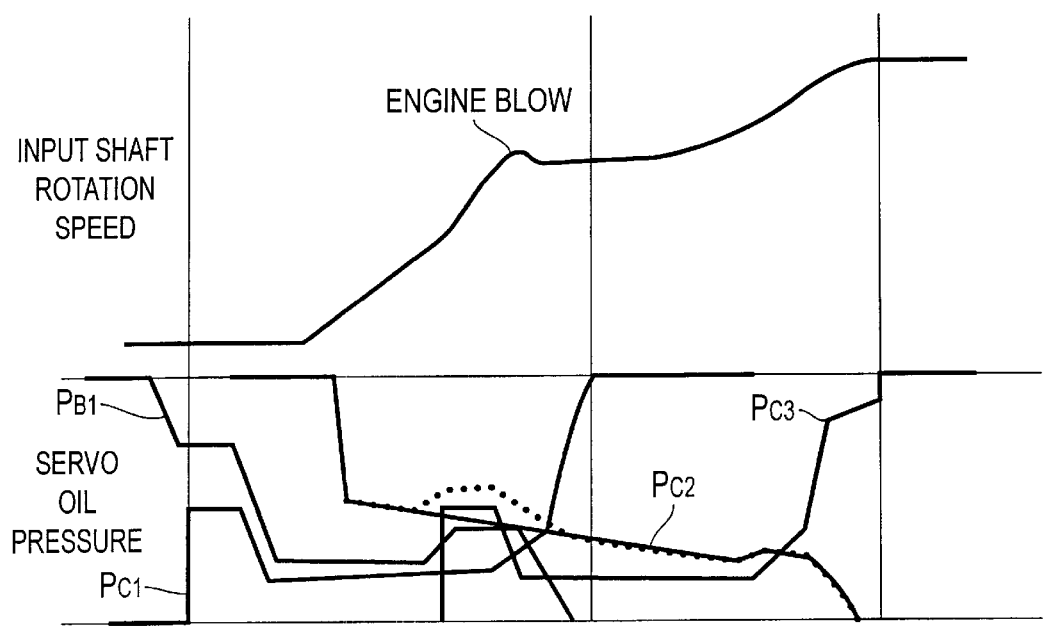
FIG. 15 is a time chart indicating a state where an engine blow occurs during a speed shift without the control of the invention.
Figure 16:
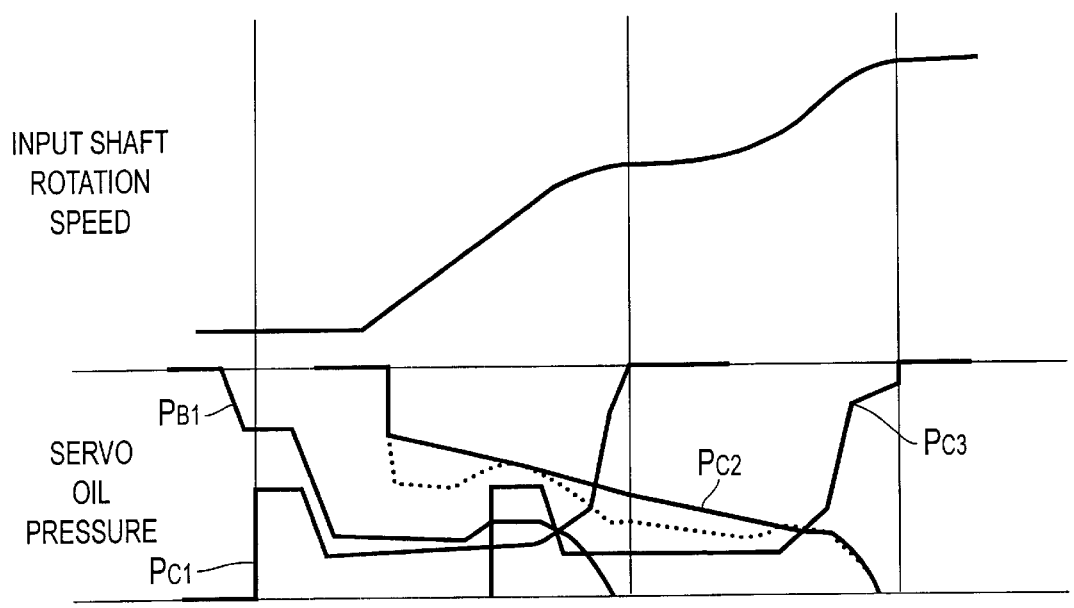
FIG. 16 is a time chart indicating a state where a prolonged speed shift occurs when the control of the invention is not performed.

FIGS. 15 and 16 show speed shift time charts regarding cases where a control is performed based only on determination regarding the degree of progress of the shift without taking the torque sharing of the brake B-1 and the clutch C-1, for comparison with the above-described 6-3 speed shift. In the time chart of FIG. 15, when the B1 pressure is raised by feedback, the C2 pressure does not correspondingly increase, so that slip occurs in the clutch C-2. Therefore, an engine blow occurs as can be understood from the input shaft rotation speed. In the time chart of FIG. 16, when the C1 pressure increases, the C2 pressure does not correspondingly decrease, so that slip does not promptly occur in the clutch C-2. Therefore, a prolonged shift with two stages occurs. In contrast, in the time chart of FIG. 15, the 6-4-3 speed shift is accomplished as a single speed shift with the input shaft rotation speed increasing uniformly.

According to the speed shift control apparatus of the embodiment, since the release of the clutch C-2 is started after the release of the brake B-1 is started, and since the engagement of the clutch C-3 is completed after the engagement of the clutch C-1 is completed, the duration of maintenance of engagement of an engageable element, that is, the engagement of the clutch C-2 until the start of the release thereof, and the engagement of the clutch C-1 after the completion of the engagement thereof, is increased, and the duration of a state where all the four engageable elements are slipping is minimized. Furthermore, since the release of the clutch C-2 is started before the engagement of the clutch C-1 is completed, a state where neither one of the two elements is completely engaged is established during an intermediate period of the speed shift. Therefore, it is possible to accomplish a continuous speed shift, not a two-stage speed shift, while allowing progress of a speed shift in an ideal state.

Although the embodiment has been described in conjunction with the 6→3 speed shift, the shift control for the 5→2 speed shift is substantially the same as the above-described shift control, except that different engageable elements are controlled. In the 5→2 speed shift control, the first engageable element is the clutch C-2, the second engageable element is the clutch C-3, and the third engageable element is the clutch C-1. However, this gear train has, as a particularity, a construction in which the engagement of the one-way clutch F-1, as the fourth engageable element, is adopted instead of the engagement of the brake B-1 in order to achieve the 2nd speed. Therefore, unlike the 6→3 speed shift, the oil pressure control for engaging the brake B-1 in the second shift stage (3-2 speed shift) is unnecessary, which correspondingly simplifies the control.

While the invention has been described with reference to a representative embodiment of a specific gear train, the spirit of the invention is not limited by the exemplary gear train, but is applicable to all gear trains wherein in a speed shift involving four engageable elements, the engagement-release relationship among the engageable elements is a two-element simultaneous engagement switch relationship.

What is claimed is:

1. A speed shift control apparatus of an automatic transmission wherein a speed shift from a first gear speed to a second gear speed requires operation of four engageable elements, the first gear speed being achieved by an engagement of a first engageable element and an engagement of a second engageable element, the second gear speed being achieved by an engagement of a third engageable element and an engagement of a fourth engageable element, the speed shift control apparatus comprising speed shift control means for controlling a state of the second engageable element in accordance with a state of the first engageable element.

2. A speed shift control apparatus of an automatic transmission according to claim 1, further comprising a hydraulic servo for each of the engaged elements and wherein the first engageable element and the second engageable element are controlled based on oil pressures of the hydraulic servos for the first and second engageable elements, and the oil pressure of the hydraulic servo of the second engageable element is changed in accordance with a change in the oil pressure of the hydraulic servo of the first engageable element.

3. A speed shift control apparatus of an automatic transmission according to claim 2, wherein the speed shift control means calculates a reference oil pressure of the second engageable element based on an input torque and a torque share of the second engageable element needed to achieve the first gear speed, and a first correction oil pressure for correcting the reference oil pressure in accordance with the oil pressure of the hydraulic servo of the first engageable element, and determines the oil pressure of the hydraulic servo of the second engageable element based on the reference oil pressure and the first correction oil pressure.

4. A speed shift control apparatus of an automatic transmission according to claim 3, wherein the first correction oil pressure is determined in accordance with a torque capacity of the first engageable element that is produced in accordance with the oil pressure of the hydraulic servo of the first engageable element.

5. A speed shift control apparatus of an automatic transmission according to claim 1, wherein the second engageable element starts to be released after the first engageable element starts to be released, and wherein the engagement of the fourth engageable element is completed after the engagement of the third engageable element is completed.

6. A speed shift control apparatus of an automatic transmission according to claim 5, wherein the speed shift control means controls the second engageable element so that the second engageable element starts to be released before the engagement of the third engageable element is completed.

7. A speed shift control apparatus of an automatic transmission according to claim 1, wherein the speed shift control means starts a release control of the second engageable element during a control of releasing the first engageable element and engaging of the third engageable element.

8. A speed shift control apparatus of an automatic transmission wherein a speed shift from a first gear speed to a second gear speed requires operation of four engageable elements, the first gear speed being achieved by an engagement of a first engageable element and an engagement of a second engageable element, the second gear speed being achieved by an engagement of a third engageable element and an engagement of a fourth engageable element, the speed shift control apparatus comprising speed shift control means for controlling a state of the second engageable element in accordance with a state of the third engageable element; and the second engageable element starts to be released after the first engageable element starts to be released.

9. A speed shift control apparatus of an automatic transmission according to claim 8, wherein the second engageable element and the third engageable element are controlled based on oil pressures of hydraulic servos of the second and third engageable elements, and the oil pressure of the hydraulic servo of the second engageable element is changed in accordance with a change in the oil pressure of the hydraulic servo of the third engageable element.

10. A speed shift control apparatus of an automatic transmission according to claim 9, wherein the speed shift control means calculates a reference oil pressure of the second engageable element determined in accordance with an input torque and a torque share of the second engageable element needed to achieve the first gear speed, and a second correction oil pressure for correcting the reference oil pressure in accordance with the oil pressure of the hydraulic servo of the third engageable element, and determines the oil pressure of the hydraulic servo of the second engageable element based on the reference oil pressure and the second correction oil pressure.

11. A speed shift control apparatus of an automatic transmission according to claim 10, wherein the automatic transmission achieves the first gear speed by engaging the first engageable element and the second engageable element, and achieves the second gear speed by engaging the third engageable element and the fourth engageable element, and achieves a third gear speed by engaging the second engageable element and the third engageable element, and wherein the second correction oil pressure is determined by a state of transition from the first gear speed to the second gear speed, a torque capacity needed to achieve the first gear speed, and a torque capacity needed to achieve the second gear speed.

12. A speed shift control apparatus of an automatic transmission according to claim 11, wherein the second correction oil pressure is determined in accordance with the state of transition, based on a value obtained by a linear interpolation of a torque capacity of the second engageable element needed to achieve the first gear speed and a torque capacity of the second engageable element needed to achieve the third gear speed.

13. A speed shift control apparatus of an automatic transmission according to claim 11, wherein a state of transition from the first gear speed to the third gear speed is determined in accordance with a torque capacity of the third engageable element that is produced by the oil pressure of the hydraulic servo of the third engageable element.

14. A speed shift control apparatus of an automatic transmission according to claim 10, wherein if the oil pressure of the hydraulic servo of the second engageable element calculated is lower than a predetermined guard oil pressure, the predetermined guard oil pressure is supplied to the hydraulic servo of the second engageable element.

15. A speed shift control apparatus of an automatic transmission wherein a speed shift from a first gear speed to a second gear speed needs operation of four engageable elements, and the first gear speed is achieved by an engagement of a first engageable element and an engagement of a second engageable element, and the second gear speed is achieved by an engagement of a third engageable element and an engagement of a fourth engageable element, the speed shift control apparatus comprising speed shift control means for controlling a state of the second engageable element in accordance with a state of the first engageable element and a state of the third engageable element.

16. A speed shift control apparatus of an automatic transmission according to claim 15, wherein at least one of the first engageable element and the third engageable element is controlled in accordance with the state of another one of the first and third engageable elements.

17. A speed shift control apparatus of an automatic transmission according to claim 16, wherein the first engageable element, the second engageable element and the third engageable element are controlled based on oil pressures of hydraulic servos of the first, second and third engageable elements, the oil pressure of the hydraulic servo of the second engageable element being changed in accordance with a change in the oil pressure of the hydraulic servo of the first engageable element and in accordance with a change in the oil pressure of the hydraulic servo of the third engageable element.

18. A speed shift control apparatus of an automatic transmission according to claim 17, wherein the speed shift control means calculates a reference oil pressure of the second engageable element based on an input torque and a torque share of the second engageable element required to achieve the first gear speed, the speed shift control means calculates a first correction oil pressure for correcting the reference oil pressure in accordance with the oil pressure of the hydraulic servo of the first engageable element, the speed shift control means calculates a second correction oil pressure for correcting the reference oil pressure in accordance with the oil pressure of the hydraulic servo of the third engageable element, and the speed shift control means determines the oil pressure of the hydraulic servo of the second engageable element based on the reference oil pressure, the first correction oil pressure and the second correction oil pressure.

19. A speed shift control apparatus of an automatic transmission according to claim 18, wherein the first correction oil pressure is determined in accordance with a torque capacity of the first engageable element that is produced in accordance with the oil pressure of the hydraulic servo of the first engageable element.

20. A speed shift control apparatus of an automatic transmission according to claim 18, wherein the automatic transmission achieves the first gear speed by engaging the first engageable element and the second engageable element, the automatic transmission achieves the second gear speed by engaging the third engageable element and the fourth engageable element, and the automatic transmission achieves a third gear speed by engaging the second engageable element and the third engageable element, and wherein the second correction oil pressure is determined by a state of transition from the first gear speed to the second gear speed, a torque capacity needed to achieve the first gear speed, and a torque capacity needed to achieve the second gear speed.

21. A speed shift control apparatus of an automatic transmission according to claim 20, wherein the second correction oil pressure is determined in accordance with the state of transition, based on a value obtained by a linear interpolation of a torque capacity of the second engageable element needed to achieve the first gear speed and a torque capacity of the second engageable element needed to achieve the third gear speed.

22. A speed shift control apparatus of an automatic transmission according to claim 20, wherein a state of transition from the first gear speed to the third gear speed is determined in accordance with a torque capacity of the third engageable element that is produced by the oil pressure of the hydraulic servo of the third engageable element.

23. A speed shift control apparatus of an automatic transmission according to claim 18, wherein the oil pressure of the hydraulic servo of the second engageable element starts to be reduced when a state of progress of a control of releasing the first engageable element and engaging the third engageable element exceeds a first predetermined value.

24. A speed shift control apparatus of an automatic transmission according to claim 23, wherein the oil pressure of the hydraulic servo of the second engageable element is reduced to a predetermined oil pressure immediately after the oil pressure of the hydraulic servo of the second engageable element starts to be reduced.

25. A speed shift control apparatus of an automatic transmission according to claim 24, wherein the predetermined oil pressure is an oil pressure obtained by multiplying the reference oil pressure of the hydraulic servo of the second engageable element and the correction oil pressure by a predetermined safety factor.

26. A speed shift control apparatus of an automatic transmission according to claim 25, wherein the safety factor decreases in accordance with the state of progress of a control of a speed shift from the first gear speed to the third gear speed.

27. A speed shift control apparatus of an automatic transmission according to claim 26, wherein the oil pressure of the hydraulic servo of the second engageable element is controlled so that the second engageable element slips when the state of progress of the speed shift exceeds a second predetermined value.

28. A speed shift control apparatus of an automatic transmission according to claim 18, wherein the oil pressure of the hydraulic servo of the second engageable element starts to be reduced when the oil pressure of the hydraulic servo of the first engageable element becomes lower than a predetermined oil pressure.

29. A speed shift control apparatus of an automatic transmission according to claim 28, wherein the oil pressure of the hydraulic servo of the second engageable element is reduced to a predetermined oil pressure immediately after the oil pressure of the hydraulic servo of the second engageable element starts to be reduced.

30. A speed shift control apparatus of an automatic transmission according to claim 29, wherein the predetermined oil pressure is an oil pressure obtained by multiplying the reference oil pressure of the hydraulic servo of the second engageable element and the correction oil pressure by a predetermined safety factor.

31. A speed shift control apparatus of an automatic transmission according to claim 30, wherein the safety factor decreases in accordance with the state of progress of a control of a speed shift from the first gear speed to the third gear speed.

32. A speed shift control apparatus of an automatic transmission according to claim 31, wherein the oil pressure of the hydraulic servo of the second engageable element is controlled so that the second engageable element slips when the state of progress of the speed shift exceeds a second predetermined value.

* * * * *